United States Patent
Gilbert

(10) Patent No.: US 9,600,284 B2
(45) Date of Patent: Mar. 21, 2017

(54) COMPUTER PROGRAM INSTRUCTION ANALYSIS

(71) Applicant: International Business Machines Corporation, Armonk, NY (US)

(72) Inventor: David A. Gilbert, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/929,861

(22) Filed: Nov. 2, 2015

(65) Prior Publication Data

US 2016/0054996 A1 Feb. 25, 2016

Related U.S. Application Data

(63) Continuation of application No. 13/862,796, filed on Apr. 15, 2013, now Pat. No. 9,389,866.

(30) Foreign Application Priority Data

Apr. 19, 2012 (GB) .................................. 1206884.7

(51) Int. Cl.
*G06F 9/00* (2006.01)
*G06F 9/44* (2006.01)
*G06F 9/30* (2006.01)
*G06F 11/36* (2006.01)

(52) U.S. Cl.
CPC ........ *G06F 9/3016* (2013.01); *G06F 9/30076* (2013.01); *G06F 11/3636* (2013.01)

(58) Field of Classification Search
None
See application file for complete search history.

(56) References Cited

U.S. PATENT DOCUMENTS

| 4,714,994 | A | 12/1987 | Oklobdzija |
| 5,590,296 | A | 12/1996 | Matsuo |
| 6,209,079 | B1 | 3/2001 | Otani et al. |
| 6,336,184 | B1 * | 1/2002 | Burke ................... G06F 9/3005 710/260 |
| 6,567,933 | B1 | 5/2003 | Swoboda |
| 6,708,180 | B1 * | 3/2004 | Dyck ........................ G06F 8/78 707/718 |

(Continued)

OTHER PUBLICATIONS

Office Action, U.S. Appl. No. 13/862,796, Notification Date Oct. 22, 2015.

*Primary Examiner* — Michael Sun
(74) *Attorney, Agent, or Firm* — Matthew C. Zehrer

(57) ABSTRACT

Disclosed is a method of analysis of a computer program instruction for use in a central processing unit having a decoding unit. The method includes receiving an address of an instruction to be analyzed, fetching said instruction stored at said address, decoding by a decoding unit associated with the central processing unit, the fetched instruction, and returning the results of said decoding of said fetched instruction. The decoded results may be returned as a data block stored in memory associated with the central processing unit or in one or more registers of the central processing unit. The decoded results may include the type of the instruction and/or the instruction length. The method may further include analyzing the decoded results to determine whether the instruction may be replaced with one of a trap or a break point.

1 Claim, 2 Drawing Sheets

(56) References Cited

U.S. PATENT DOCUMENTS

| | | |
|---|---|---|
| 6,889,320 B1 | 5/2005 | Davis et al. |
| 7,013,456 B1 | 3/2006 | Van Dyke |
| 8,037,285 B1 | 10/2011 | Thaik et al. |
| 2002/0013918 A1* | 1/2002 | Swoboda ............... G06F 11/261 714/30 |
| 2002/0138712 A1 | 9/2002 | Yoshida |
| 2003/0200425 A1 | 10/2003 | Swoboda |
| 2005/0060522 A1 | 3/2005 | Correa |
| 2005/0172100 A1 | 8/2005 | Di Gregorio |
| 2006/0015708 A1 | 1/2006 | Boggs et al. |
| 2006/0069959 A1 | 3/2006 | Schultz |
| 2006/0259750 A1 | 11/2006 | Swoboda |
| 2007/0220334 A1* | 9/2007 | Pedersen ............. G06F 11/3648 714/30 |
| 2008/0320247 A1* | 12/2008 | Morfey ..................... G06F 1/24 711/154 |
| 2009/0063822 A1 | 3/2009 | Yasufuku |
| 2010/0005276 A1 | 1/2010 | Miwa |
| 2012/0117301 A1* | 5/2012 | Wingard ............. G06F 12/1027 711/6 |

\* cited by examiner

COMPUTER PROGRAM INSTRUCTION ANALYSIS

FIELD OF THE INVENTION

The present invention relates to analysis of a computer program instruction, and in particular to analysis of a computer program instruction in order to determine its effect on inserted trace function calls or on inserted breakpoints.

BACKGROUND

In modern operating systems and run time environments it is often necessary to inspect the binary code of a computer program to, for example, insert calls to trace functions or breakpoints. This may be done by, for example, replacing an instruction in the binary code by a trap (i.e. a program interrupt) or by a call to a debug program. However, sometimes it is necessary to know something about the instruction in the binary code which is to be replaced. This is typically done by software within the debug program which replicates the function of the "instruction decoder" or Decoder Unit inside a Central Processing Unit (CPU).

The code to do the inspection of the binary code is typically similar to that in a disassembler which decodes the instructions and decides if and how they can be modified. Whenever a new instruction is added to a CPU this code for inspecting the binary code stops working and has to be modified to take account of the added instruction. This modification is necessary even if the instruction that is added is one that is simple (such as a new arithmetic or vector operation) which doesn't really need to be treated differently by the code inspecting the binary code.

Published United States patent application 2009/0063822 A1 discloses an instruction analyzing section that analyses an instruction to be processed and outputs analysis information indicating whether the instruction matches with a specific instruction that is previously defined (such as a NOP); a memory that temporarily stores the instruction with that analysis information; and a specific instruction execute controller that reads out the analysis information stored in the memory and controls operation of at least one of the instruction fetch unit and the instruction decode unit when the analysis instruction indicates that the instruction matches with the specific instruction (i.e. that it is a NOP).

Published United States patent application 2008/0307397 A1 discloses that program code is statically analyzed (without actually executing the code) including by virtually executing the code with a virtual processor or emulator that steps through the code. Programming logic errors can be located, such as calls that never return or isolated code that can never be reached.

Published United States patent application 2007/0174817 A1 discloses receiving binary code and code analysis rules. At least one code analysis rule is indicative of a query related to the functionality of the binary code. The query is implemented in analysis code configured to determine results of the query.

BRIEF SUMMARY OF THE INVENTION

In an embodiment of the present invention, a method of analysis of a computer program instruction for use in a central processing unit having a decoding unit includes receiving an address of an instruction to be analyzed; fetching said instruction stored at said address; decoding by a decoding unit associated with the central processing unit, the fetched instruction; and returning the results of said decoding of said fetched instruction.

The decoded results may be returned as a data block stored in memory associated with the central processing unit and or may be returned in one or more registers of the central processing unit.

The decoded results may include the type of the instruction and or may include the instruction length.

The method may further include analyzing the decoded results to determine whether the instruction may be replaced with one of a trap or a break point.

BRIEF DESCRIPTION OF THE DRAWINGS

Preferred embodiments of the present invention will now be described in more detail, by way of example only, with reference to the accompanying drawings, in which.

DETAILED DESCRIPTION OF THE EMBODIMENTS

Figure 1:
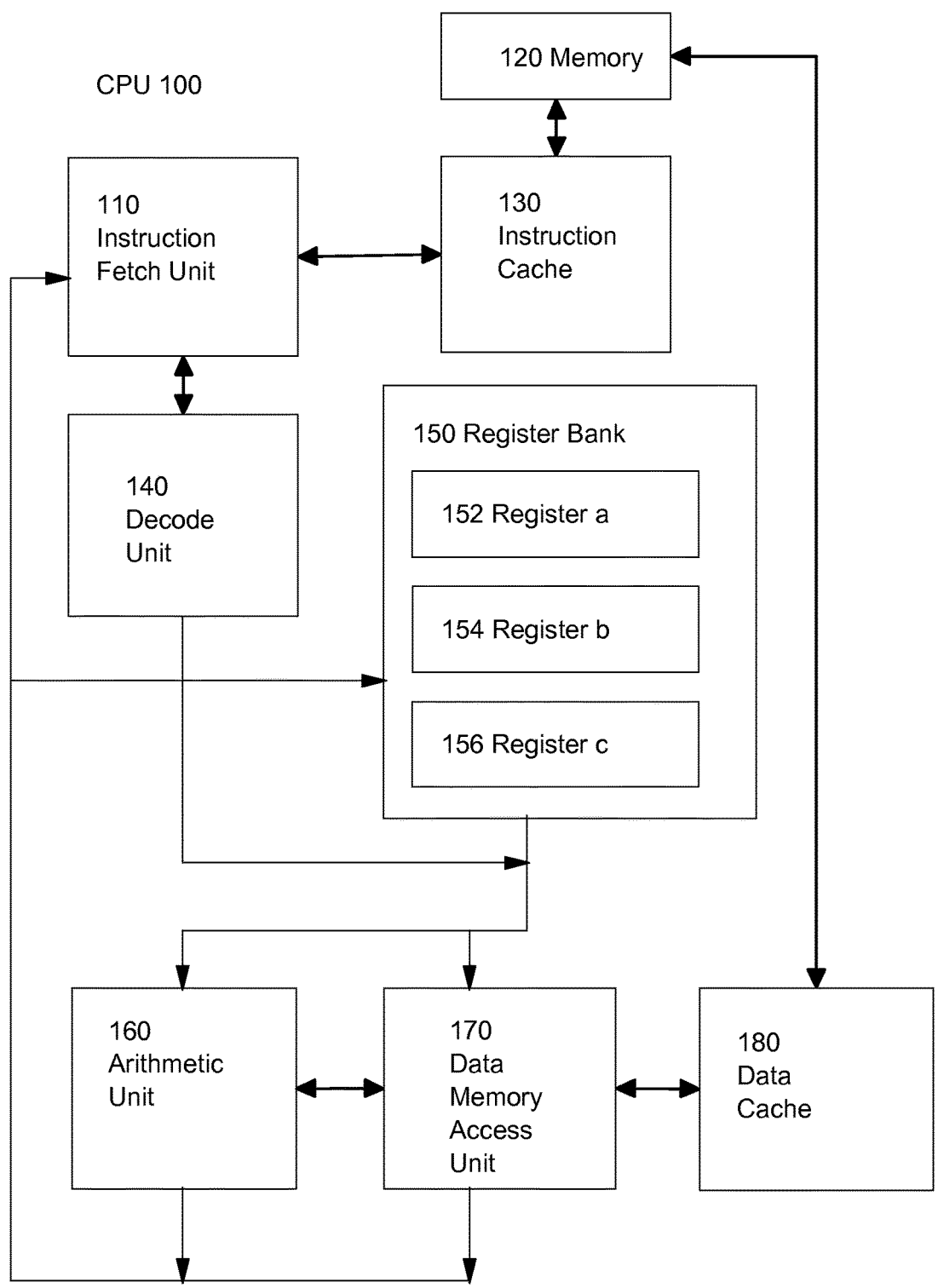
FIG. 1 shows a hardware architecture in which embodiments of the present invention may be used.

Referring to FIG. 1, a conventional CPU 100 has an Instruction Fetch Unit 110 that fetches instructions from Memory 120, via an Instruction Cache 130, that are decoded by a Decode Unit 140 to identify what resources the instructions access, what operations the instructions should perform, the instruction length and the like. The decoded information is then used to control a Register Bank 150 to read values to supply to execution units, such as an Arithmetic Unit 160 and a Data Memory Access Unit 170. The decoded information also controls these execution units 160, 170 and optionally other units and components not shown in FIG. 1. The data the execution units 160, 170 use can come from one or more registers in the Register Bank 150 such as, for example, the result of a previous operation which is stored in a register. The data can also come from a portion of the instruction itself, such as, for example, direct data incorporated in the instruction. Also shown in FIG. 1 is a Data Cache 180 which is used to cache data when it is required to transfer data between the Memory 120 and the Data Memory Access Unit 170. The Data Cache 180 is not relevant to embodiments of the present invention and will not be referred to further.

An example of an execution unit, in this case the Arithmetic Unit 160, using data that comes from one or more registers is an instruction:

$$\text{Register } a := \text{Register } b + \text{Register } c \quad (1)$$

In this case the Decode Unit 140 instructs the Register Bank 150 to read Register b 154 and Register c 156 and pass the contents to the Arithmetic Unit 160. The Decode Unit 140 then instructs the Arithmetic Unit 160 to add the contents of Register b 154 and the contents of Register c 156 and send the result to the Register Bank 150. The Decode Unit 140 instructs the Register Bank 150 to store the received result in Register a 152.

Another example of an execution unit, in this case the Arithmetic Unit 160 using data that comes from one or more registers is an instruction:

$$\text{Register } a := \text{Register } b + \text{constant}(42) \quad (2)$$

In this case the Decode Unit 140 extracts the constant(42) value from the instruction and passes it to the Arithmetic Unit 160. The Arithmetic Unit 160 gets the contents of Register b 154 in the same manner as described above in connection with the last instruction, that is, the Decode Unit 140 instructs the Register Bank 150 to read Register b 154 and pass the contents of it to the Arithmetic Unit 160. The Decode Unit 140 then instructs the Arithmetic Unit 160 to add Register b 154 and the constant(42) value and send the result to the Register Bank 150. The Decode Unit 140 instructs the Register Bank 150 to store the received result in Register a 152.

The output of these execution units 160, 170 can also be sent to the Instruction Fetch Unit 110 to instruct it to do something different from its normal sequential operation, such as to start fetching instructions from a different location, or to fetch a single instruction from a special location. Examples of such instructions include:

$$\text{Branch to location constant(1000)} \qquad (3)$$

In this case Decode Unit 140 extracts the constant(1000) value from the instruction and sends it to the Instruction Fetch Unit 110 with a message that says 'start fetching instructions from this new location'. The constant value may optionally be sent via the Arithmetic Unit 160.

$$\text{Execute location constant(1000)} \qquad (4)$$

In this case Decode Unit 140 extracts the constant(1000) value from the instruction and sends it to the Instruction Fetch Unit 110 with a message that says 'Execute from this location and then carry on with where you were'. The constant value may optionally be sent via the Arithmetic Unit 160.

$$\text{Branch to location in Register-b+constant(42)} \qquad (5)$$

This is similar to instruction (2) above, but instead of the Decode Unit 140 instructing the Arithmetic Unit 160 to send the result to the Register Bank 150, the Decode Unit 140 instructs the Arithmetic Unit to send the result to the Instruction Fetch Unit 110 together with the message 'start fetching instructions from this new location'. The constant value may optionally be sent via the Arithmetic Unit 160.

The above five example instructions describe the process that a conventional CPU follows for what are quite simple instructions. However, in many conventional CPUs the instructions are quite complex and vary greatly in both what they do and what the length of the instruction is. Additionally, the Decode Unit 140 decodes much information from the instructions that it receives to decode and uses this decoded information for control of itself and other portions of the CPU.

Embodiments of the present invention provide an 'analysethis' instruction which is added to the CPU instruction set. Whilst in this description, reference is made to the instruction 'analysethis', it is clear to the person skilled in the art that the particular name used for the instruction is irrelevant, only the function it provides is important.

Figure 2:
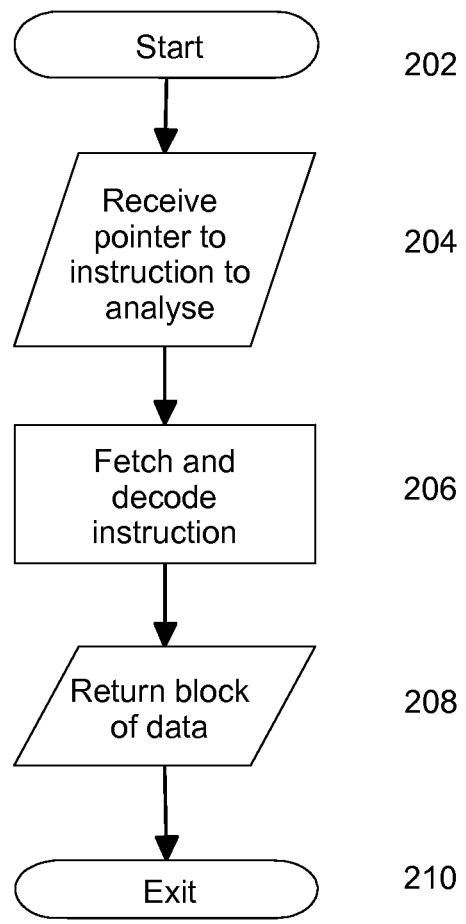
FIG. 2 shows a flow diagram of the steps carried out by embodiments of the present invention.

FIG. 2 is a flow chart of the steps which an embodiment of the 'analysethis' instruction carries out. The method starts at step 202 by being called from a program, such as a debug program. At step 204, the method receives a pointer to an instruction to be analyzed, the instruction being stored in Memory 120. For example, the method may receive a pointer to location (Register b+constant(42)). At step 206, the method fetches and decodes the instruction found at location (Register b+constant(42)). At step 208, the method returns a data block (300 in FIG. 3) back to the calling process. For example, this may return in Register a 152, a pointer to the location in memory where a data block 300 can be found. The memory may be closely associated with a CPU such as a cache store or may be less closely associated such as semiconductor memory or even disc storage. In another embodiment, the results may be returned directly in Register a 152 or in any combination of one or more registers. At step 210, the method exits.

Figure 3:
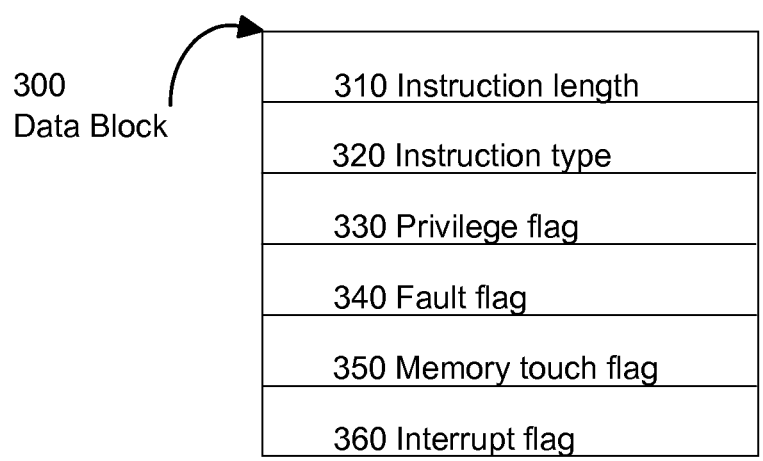
FIG. 3 shows a data block returned by embodiments of the present invention.

FIG. 3 shows an embodiment of the data block 300 returned at step 300 above. Embodiments of the data block 300 may not include some or all of the identified items or may include other items not shown in FIG. 3. The embodiment of FIG. 3 includes the instruction length 310 and the type 320 of the instruction, that is whether it is a data handling or memory operation, an arithmetic or logic instruction, a control flow instruction or any one of many other types of instruction. Typically, a data handling and memory operation may set a register to a constant value or transfer data between a memory and a register. An arithmetic and logic instruction may perform an arithmetic operation on the values contained in two registers or one register and a constant value, placing the result in a register and optionally setting one or more condition codes in a status register. It may also manipulate individual bits of a register by negating them or by combining them with bits from another register or memory. It may also compare two registers or compare a register with a value stored in memory or with a constant and set one or more condition codes on a status register. A control flow instruction may cause an unconditional or a conditional branch to another location in memory from where instructions are to be executed or may branch to another location, storing the next succeeding location to it as a return address to which processing will return. The embodiment also includes a flag 330 indicating whether the instruction is privileged, a flag 340 indicating whether the instruction can fault, a flag 350 indicating if the instruction can touch memory and a flag 360 indicating if the instruction can cause an interrupt.

Referring back to FIG. 2, when the Instruction Fetch Unit 110 and the Decode Unit 140 fetch and decode an 'analysethis' instruction, they first store away the location of the current instruction stream in order to allow a return to processing that instruction stream. The Decode Unit 140 may use other elements of the CPU 100, such as the Arithmetic Unit 160 or the Register Bank 150, to calculate the address associated with the 'analysethis' instruction. The address is then passed to the Instruction Fetch Unit 110 which fetches the instruction at the address associated with the 'analysethis' instruction and passes the instruction to the Decode Unit 140. Once the instruction is decoded by the Decode Unit 140 the results are not passed to the Arithmetic Unit 160 or the Data Memory Access Unit 170, nor are they used to instruct the Register Bank 150 as to what to do. Instead, the results are returned as described with reference to step 208 above. The location of the current instruction stream which was stored away above is retrieved and execution then carries on with the current instruction stream, which will analyse the returned data block or the data returned in the register or registers.

Since the conventional CPU already has an Instruction Fetch Unit 110 and a Decode Unit 140 for normal execution of program instructions there are few or no additional hardware elements required. The performance of the 'analysethis' instruction within the CPU instruction set is not very important because the set of instructions currently being carried out in software to figure out what an instruction does is complex. Thus, the 'analysethis' instruction doesn't have to be performed very quickly to still be much better than implementing it in software.

The method of FIG. 2 of analysis of a computer program instruction allows a code analyzer program such as a tracing program, debugger or similar to analyse instructions which it is proposed to replace with a trap (i.e. a program interrupt) or by a call to a debug program. That analysis may conclude that the instruction is one that can be replaced without any harm, that is without affecting the operation of the program up to the point where it is reached or subsequently. The code analyzer program does not have to manually decode exactly what the instruction is and what its effects are, that work is done by the pre-existing Decoder Unit in the CPU. This has the advantage that most new instructions wouldn't stop the code analyzer working because the code analyzer doesn't need to understand the exact details of the new instructions, but only the contents of the data block returned by embodiments of this invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of analysis of a computer program instruction for use in a central processing unit (CPU) comprising a decoding unit, the method comprising:

receiving, with the CPU, an address of an instruction stored in memory to be analyzed;

fetching, with the CPU, the instruction stored at the address;

decoding, with the decoding unit, the fetched instruction;

generating, with the decoding unit, results of the decode of the fetched instruction as a data block that is not passed from the decoding unit to an arithmetic unit within the CPU nor is passed from the decoding unit to a memory access unit within the CPU, the data block comprising: a fetched instruction length value within an instruction length field, a fetched instruction type value within an instruction type field, a privilege flag value within a privilege flag field that indicates whether the fetched instruction is privileged, a fault flag value within a fault flag field that indicates whether the fetched instruction can fault, a memory access flag value within a memory access flag field that indicates whether the fetched instruction can access memory, and an interrupt flag value within an interrupt flag field that indicates whether the fetched instruction can cause an interrupt;

passing, with the decoding unit, the data block to a register within the CPU which stores the data block; and analyzing, the instruction with an analysis program called by the CPU, by accessing the data block from the register to determine whether the instruction may be replaced with one of a trap or a break point.

* * * * *